(12) United States Patent
Rhodes

(10) Patent No.: US 7,219,225 B2
(45) Date of Patent: May 15, 2007

(54) NETWORK ARRANGEMENT FOR COMMUNICATION

(75) Inventor: Ian Rhodes, Espoo (FI)

(73) Assignee: Nokia Corporation, Espoo (FI)

( * ) Notice: Subject to any disclaimer, the term of this patent is extended or adjusted under 35 U.S.C. 154(b) by 535 days.

(21) Appl. No.: 09/934,166

(22) Filed: Aug. 20, 2001

(65) Prior Publication Data

US 2002/0049902 A1    Apr. 25, 2002

Related U.S. Application Data

(63) Continuation of application No. PCT/GB00/00602, filed on Feb. 18, 2000.

(30) Foreign Application Priority Data

Feb. 19, 1999 (GB) ............................ 9903902.6
Feb. 19, 1999 (GB) ............................ 9903904.2

(51) Int. Cl.
   *H04L 9/00* (2006.01)
(52) U.S. Cl. ............................ 713/153; 726/3; 726/11; 709/224; 709/225
(58) Field of Classification Search ................ 713/153, 713/201, 200; 709/245, 223–225; 308/21, 308/49; 370/352, 338; 380/21, 49; 726/11, 726/3

See application file for complete search history.

(56) References Cited

U.S. PATENT DOCUMENTS 5,442,708 A    8/1995 Adams, Jr. et al.
5,548,649 A *  8/1996 Jacobson ................... 713/153
5,588,060 A    12/1996 Aziz
5,825,891 A    10/1998 Levesque et al.
5,850,444 A * 12/1998 Rune ........................ 705/79
5,940,591 A *  8/1999 Boyle et al. ................ 713/201
6,173,399 B1 * 1/2001 Gilbrech .................... 713/153
6,373,946 B1 * 4/2002 Johnston .................... 380/211
6,421,339 B1 * 7/2002 Thomas ..................... 370/352
6,614,774 B1 * 9/2003 Wang ........................ 370/338

FOREIGN PATENT DOCUMENTS

EP          0814589 A2       12/1997
WO          WO 98/57465      12/1998

* cited by examiner

*Primary Examiner*—Kim Vu
*Assistant Examiner*—T. B. Truong
(74) *Attorney, Agent, or Firm*—Squire, Sanders & Dempsey, LLP.

(57) ABSTRACT

A method for secure communication between a first end terminal located in a first secure network and a second end terminal located in a second secure network, said first and second networks being separated by a relatively insecure intermediate network, wherein the method including the steps of: selectively routing a communication from the first end terminal to the second end terminal over said relatively insecure intermediate network by means of one or more network elements triggerable to selectively route said communication; and encrypting said selectively routed communication by means of an encryption engine before it traverses said intermediate network, wherein said one or more network elements and said encryption engine are located substantially within said firs secure network.

40 Claims, 7 Drawing Sheets

NETWORK ARRANGEMENT FOR COMMUNICATION

This application is a continuation of international application Ser. No. PCT/GB00/00602, filed 18 Feb. 2000.

FIELD OF THE INVENTION

This invention relates to a secure method and network arrangement for communication.

BACKGROUND TO THE INVENTION

Subscribers of communication services on fixed or mobile networks register terminals for use within a given network with the operator of that network. The network operator can thus deliver relevant subscriber services and support call origination and delivery for that registered terminal. For example, following user registration, the network can perform connection set up, call routing and billing functions. Where a subscriber is mobile and visits another network, communication services may still be available by means of roaming agreements between the network operators.

Internet applications and particularly wireless Internet applications have been proposed which allow subscribers of secure local networks to choose between communication routes which are deemed relatively secure and alternative communication routes which are inherently less secure. The Internet is regarded as providing insecure communication routes, particularly when compared with traditional communication networks such as a fixed-cable telecommunication network or a mobile telecommunication network. Accordingly, if a terminal located in a first secure network wishes to communicate with a terminal located in a second secure network, the intermediate communication route can either be secure or insecure. For example an intermediate network such as the PLMN, PSTN or ISDN networks would be deemed relatively secure. However, an intermediate network incorporating the Internet would render the communication route insecure.

Where an insecure network is used the originating and terminating end terminals may use an encryption technique. Applications for implementing the chosen encryption technique need to be provided at both the originating and destination end terminals. In practice, situations arise where a plurality of end terminals in one network wish to communicate with a plurality of end terminals in another network and mutually compatible encryption applications must be provided to each of the plurality of end terminals.

Security services employed on fixed and mobile networks include encryption, certification and authentication. Encryption, for example, typically employs systems based on key pairs. That is, before transmission a subscriber protects the transmission by running an encryption application on the originating end terminal using a key. The transfer is made with the content of the message in an encrypted (protected) format. At the destination end terminal, the message is decrypted by running a mutually compatible decryption application also with a key.

One well known type of encryption application employs a "private/public key pair system", where the originating subscriber protects his transmission using a private key and the message is then transferred via an intermediate network to an end terminal where it can be decrypted by the destination subscriber by means of a public key. This system requires that the originating subscriber makes the relevant public key available to the or each destination subscriber. Subscribers do not usually make private keys available. Options for making public keys available to destination subscribers include, for example, email or posting the key on web sites which are accessible to destination subscribers. Although the keys are available to the intended recipients, this system is inconvenient and vulnerable to those who are intent on obtaining public keys for deciphering messages not intended for them. Imitation (hoax) web sites have been used to manipulate such arrangements.

Another type of key system employed in encryption applications is the "shared secret key pair system". This system requires that the originating subscriber projects his transmission using a secret key and the terminating subscriber uses the same key (shared secret key) to extract the message information. This system differs from the private/public key pair system in that it requires that each receiving subscriber has access to the senders secret key. This arrangement is only acceptable where there is a high degree of trust between originating and receiving subscribers and secure networks therebetween.

In general, encryption techniques require that both the communicating end terminals of the subscribers have access to the relevant encryption/decryption algorithms/keys etc. The communicating end terminals must also be provided with and be able to run a suitable application. Any changes or modifications to the encryption technique at the originating end must be provided to the relevant terminal at the receiving end.

SUMMARY OF THE INVENTION

Embodiments of the present invention seek to address the problems outlined hereinbefore.

According to an aspect of the present invention there is provided a method for secure communication between a first end terminal located in a first secure network and a second end terminal located in a second secure network, said first and second networks being separated by a relatively insecure intermediate network, the method including the steps of: selectively routing a communication from the first end terminal to the second end terminal over said relatively insecure intermediate network by means of one or more network elements triggerable to selectively route said communication; and encrypting said selectively routed communication by means of an encryption engine before it traverses said intermediate network, wherein said one or more network elements and said encryption engine are located substantially within said first secure network.

Preferably the one or more triggerable network elements comprises a switch means provided with a control means, and a storage means. The storage means can store routing information and/or security information such as encryption/decryption information and electronic cash bit strings. The switch means can selectively route a predetermined type of communication according to routing information held in the storage means and the encryption engine can encrypt said selectively routed communication according to encryption information held in said storage means.

In a preferred embodiment, said predetermined types of communication are identified by means of one or more of the following triggers set up in the switch means: recognition of originating subscriber characteristics; recognition of destination subscriber characteristics; recognition of payload characteristics; or recognition of network service characteristics.

Preferably, the one or more network elements is operable to store encryption/decryption and is triggerable to distribute decryption information from said first node to one or more target nodes. Typically, the encryption/decryption information includes algorithms or keys. For example, the one or more network elements can use a private key to encrypt and can distribute a public key for use by the recipient in decryption messages.

Preferably, the encryption information held in the storage means defines a preferred algorithm or key for use with said predetermined types of communication. In addition, the information held in the storage means can identify one or more groups of users whose communications are to be routed and encrypted according to common preferences.

According to a second aspect of the present invention there is provided a secure network arrangement for communication between a first end terminal located in a first secure network and a second end terminal located in a second secure network, said first and second networks being separated by a relatively insecure intermediate network, the secure network arrangement including one or more network elements triggerable to selectively route a communication from the first end terminal to the second end terminal over said relatively insecure intermediate network and an encryption engine for encrypting said selectively routed communication before it traverses said intermediate network wherein said one or more network elements and said encryption engine are located substantially within said first secure network.

According to another aspect of the present invention there is provided a network arrangement for the distribution of security information between a first node in a first secure network and one or more nodes in a second secure network, said first and second networks being separated by a relatively insecure network, wherein communications from said first node to one or more of said second nodes via said relatively insecure network are encrypted, the network arrangement comprising one or more network elements operable to store security information and triggerable to distribute said security information in a secure manner from said first node to one or more target nodes in said second secure network.

A switch means can be operable to selectively distribute an algorithm and/or key in response to a predetermined type of communication. In preferred embodiments, said predetermined type of communication is identified by means of one or more of the following: recognition of originating subscriber characteristics, recognition of destination subscriber characteristics; recognition of payload characteristics or recognition of network service characteristics.

In other embodiments, distribution of the decryption information is triggered according to predetermined time schedules by an intelligent peripheral communicating with said network element.

Network arrangements according to the invention allow the distribution of decryption information to end terminals in the second network and/or to a node within the second network other than the destination end terminal for the communication in question. Preferred network elements may be located, for example, substantially within said first network or substantially within said second network, possibly at different levels of hierarchy.

According to another aspect of the present invention there is provided a method for the distribution of security information between a first node and one or more second nodes, including the step of providing one or more network elements operable to store security information and triggerable to distribute the security information from said first node to one or more of said second nodes.

Preferred embodiments have applications, for example, in distributing algorithms and/or keys between nodes in secure networks over a relatively insecure intermediate network but also in distributing algorithms and/or keys and/or secure numbers or bit strings etc. over different network arrangements. Examples of uses include in ECASH (electronic cash) applications.

According to another aspect of the present invention, there is provided a method for the distribution of security information between a first node and one or more second nodes, including the step of providing one or more network elements operable to store security information and triggerable to distribute the security information from said first node to one or more target nodes.

According to another aspect of the present invention, there is provided a network arrangement for the distribution of security information between a first node and one or more second nodes, including one or more network elements operable to store security information and triggerable to distribute the security information from said first node to one or more of said second nodes.

BRIEF DESCRIPTION OF DRAWINGS

For a better understanding of the present invention and to understand how the same may be brought into effect, reference will now be made by way of example only to the following Figures in which.

DESCRIPTION OF PREFERRED
EMBODIMENTS OF THE INVENTION

The term "encryption" used herein can refer either to direct encryption of the IP payload, possibly with addition of an encryption header, or tunnelled payloads (i.e. not only encrypting but adding a further network header to address the encrypted packets to a known tunnel end point). The term is also used in a broader sense to refer to general compression techniques. The term "key" can refer to encryption/decryption keys/algorithms and secure codes/numbers used, for example, in electronic cash applications.

Figure 1:
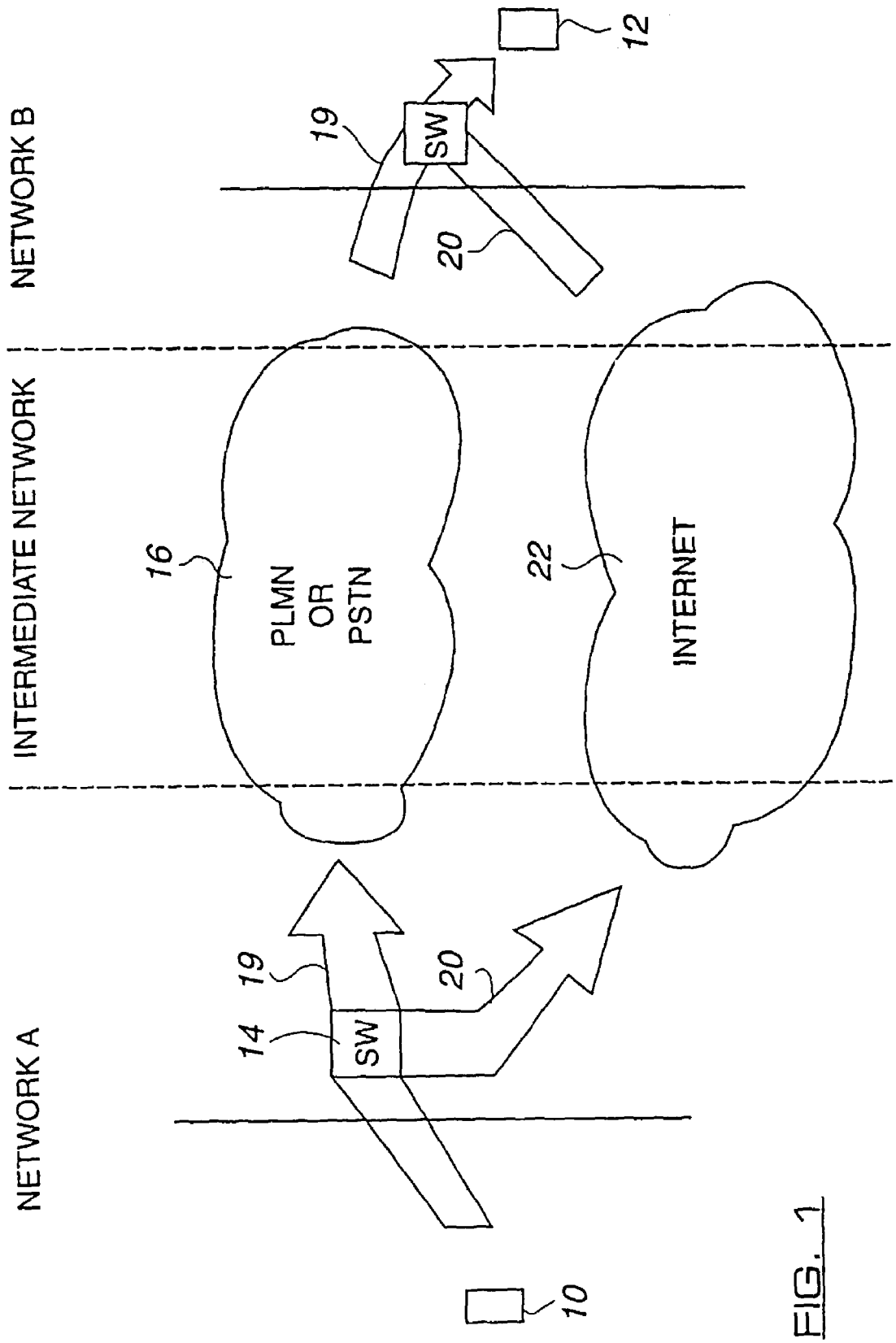
FIG. 1 schematically illustrates examples of alternative communication routes between a first end terminal in a first network and a second end terminal in a second network.

FIG. 1 shows a first end terminal 10 wishing to communicate with a second end terminal 12. The originating end terminal 10 is in a first network (A) controlled by a first network operator and the second end terminal 12 is located in a second network (B) controlled by a second network operator. The networks (A) and (B) may be fixed (e.g. PSTN) or mobile (e.g. PLMN) networks operated by trusted network operators and are thus deemed relatively secure.

The networks (A) and (B) are separated by intermediate networks which can include, for example, a public land mobile network PLMN or a switched telephone network PSTN and the Internet 22. Whereas the PLMN/PSTN 16 could be regarded as a relatively secure intermediate network for transfer between the end terminals 10 and 12, the Internet 22 would be regarded as an insecure network.

Switch 14 represents a general service switching point, for example a mobile services switching centre (MSC) or any suitable telecommunications switch or routing element. In some embodiments a service switching point SSP is provided integrally with the MSC. However, in others the SSP is provided as a separate network element. Communications can occur between the first end terminal 10 and the second end terminal 12 via a secure intermediate route indicated by arrows 19, shown here as via the PLMN/PSTN 16. Alternatively, communication between the first and second end terminals 10 and 12 can occur via an insecure intermediate route indicated by arrows 20, shown here as including the Internet 22.

Figure 2:
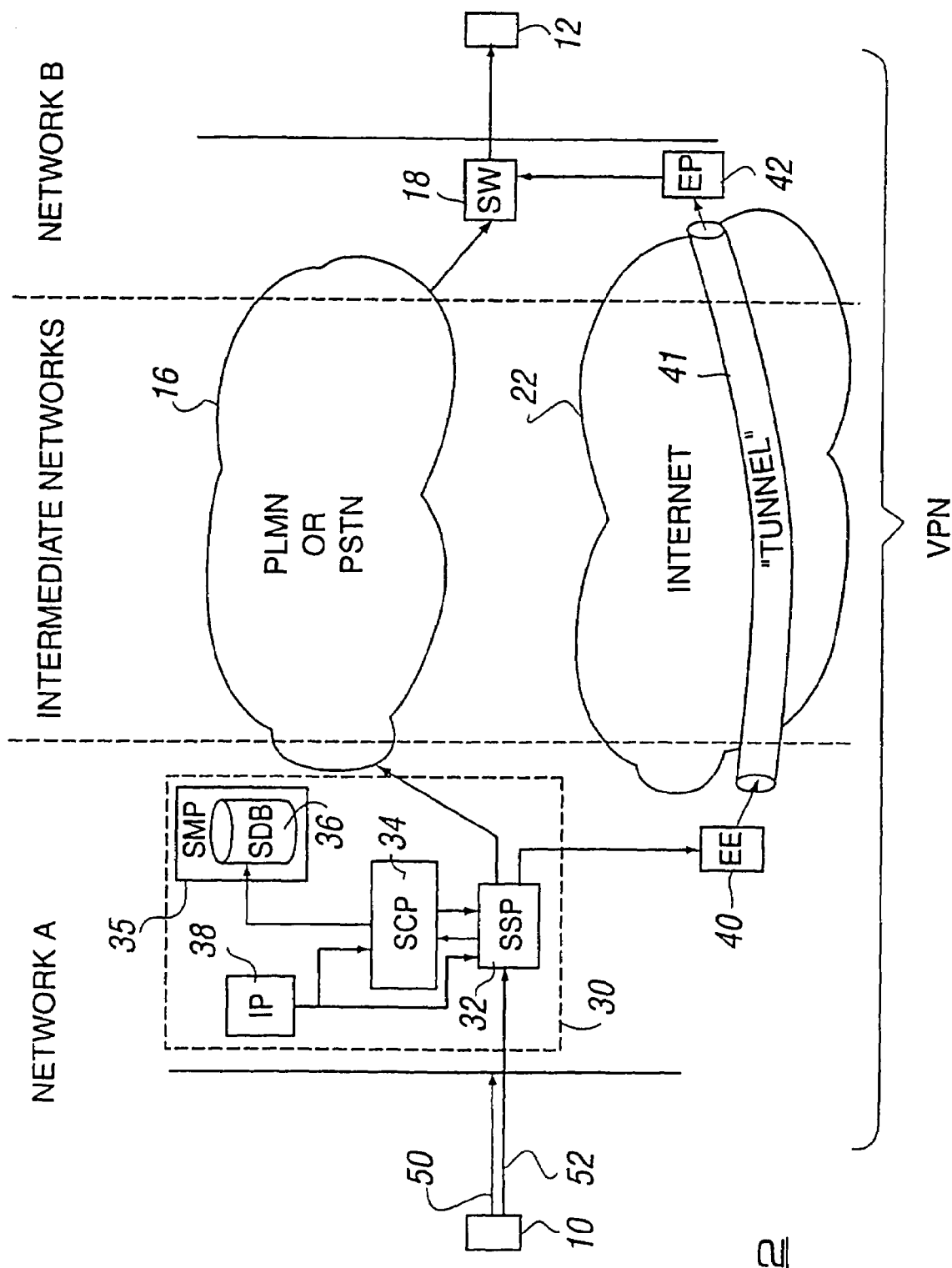
FIG. 2 schematically illustrates a preferred method for communication between first and second end terminals located in secure networks and separated by an insecure network.

Referring now to FIG. 2, a first preferred method for communication provides a secure network arrangement including a network element which permits the construction of a tunnel through the insecure network between first and second end points within the secure networks of the originating and terminating end terminals, respectively. The effect is to create a virtual private network (VPN) for secure communication between the two terminals 10 and 12. A group of logically associated intelligent network elements 30 are provided in a secure network between the first end terminal 10 and the terminating end terminal 12. In this example, the intelligent network elements 30 are provided in the network (A) of the originating end terminal 10. The intelligent network elements 30 can communicate with end terminal 10 and also communicate with an encryption engine 40 in the first network (A).

The intelligent network elements 30 include a service switching point (SSP) 32 which may or may not be provided integrally with the MSC, a service control point (SCP) 34 for providing an intelligent function, a service management point SMP 35 including service data base (SDB) 36 for storing subscriber profiles and an intelligent peripheral (IP) 38. The intelligent peripheral IP is connected to the service control point SCP and/or to the service switching point SSP by means of SS7 signalling. For example, one intelligent peripheral IP serve several service switching points SSPs and may be provided as a separate (external) network element. The service switching point 32 can transfer messages from and/or to the first end terminal 10 and one or more of the intermediate networks 16, 22. The service switching point 32 is connected to the service control point 34 which has processor functionality and access to the service database 36 of the service management point SMP 35. The intelligent peripheral 38 is connected to the service control point 34 and/or possibly directly to the SSP 32 as explained above.

To communicate with either of the intermediate networks, the service switching point 32 can transfer messages to and/or from either the PLMN/PSTN 16 or the encryption engine can be integrated to other 40 which defines a first end point of a tunnel 41 through the Internet 22. The encryption engine 40 may be provided integrally with one or more of the remainder of the group of network elements 30. Alternatively, the encryption engine 40 may be a separate (external) network element. A further switch 18 is provided in the second network (B). The switch 18 is connected to each of the intermediate networks, namely the PLMN/PSTN 16 and a second end point 42 of the Internet tunnel 41, and with the second end terminal 12. Note that the encryption engine 40 defining one end point of the tunnel 41 and the other end point 42 of the tunnel 41 are located in the first and second secure networks (A) and (B), respectively. The tunnel 41 is thus constructed as a secure passageway for transfer through the Internet 22.

The intelligent network elements 30 enable the operator of the first network (A) to offer subscribers a secure communication route over a usually insecure network. This is achieved by intelligent management of route and encryption techniques in respect of specific subscribers or groups of subscribers. In a situation where the first end terminal 10 wishes to communicate with the second end terminal 12 via the Internet 22, the first terminal 10 originates the communication and follows call access 50 and call set-up 52 procedures. Typically the end terminal 10 transmits both an identification number and a destination number on a control channel. The service switching point 32 receives the information from terminal 10 and can refer to the service control point 34 in response to a predetermined trigger. The type of trigger employed can vary but will generally be set-up such that the intelligent network elements 30 provide the subscriber of the end terminal 10 with his preferred network service. For example, the service switching point 32 can be set up to refer to the service control point 34 in response to a trigger being set, for example, on the network address of the originating 10 or terminating 12 end terminals, on flow ID which is an identity associated with a succession of packets and/or or on payload information. In this example, the trigger is set to respond to a characteristic of the destination number. In other embodiments, the service switching point 32 may recognise a range of numbers in the originating ID number, and/or destination number or may respond to prepaid only, voice only, data only messages, and be dependent on time-of-day etc. This list of possible triggers is obviously not exhaustive.

When a referral by the service switching point 32 to the service control point 34 has been triggered as described above, the service control point 34 accesses the relevant subscriber profile stored in the service database 36 of the service management point SMP 35. The subscriber profile contains subscriber specific information including information regarding the network services paid for by each subscriber or group of subscribers. In this example, the subscriber profile contains subscriber specific routing and encryption information which is taken into account whenever a trigger is determined. The information stored in the service database 36 may include one or more preferred encryption algorithms (or compression algorithms etc.) and/or keys. Subscriber specific profile information is then returned to service switching point 32 via service control point 34 and the transfer is routed as appropriate. If the subscriber in question prefers communication between the first network (A) and the second network (B) to go via the PLMN/PSTN 16, the profile information will indicate this and the service switching point 32 will direct the transfer accordingly. However, if the subscriber in question prefers communication between the first network (A) and the second network (B) to go via the Internet 22, then the service switching point 32 will redirect the communication to the encryption engine 40 where the message content is automatically encrypted using an algorithm. In this example, the preferred algorithm is part of the subscriber specific information specified in the service database 36. Once encrypted, the message content enters the Internet tunnel 41 where it remains in an encrypted format while it traverses the Internet, i.e. until it reaches the end point 42 located within the secure network (B).

The provision of triggered redirection and, where appropriate, automatic encryption permits a secure tunnel 41 to be constructed through the usually insecure Internet. From the end point 42 the message is routed on to switch 18 and thereafter to the destination end terminal 12. Between the end terminals 10, 12 and their respective access switches (i.e. the service switching point 32 and the switch 18) in the access networks (e.g. GSM or GPRS) specific encryption or physical security is used and thereby provides inherent security within the first and second networks (A) and (B).

Any information held in the service database 36 of the service management point SMP 35 can be easily modified or changed without down-loading or up-loading to and from end terminals 10, 12. For example modifications can effect updates of stored algorithms/keys or alter group lists to permit guest users of a subscriber to benefit from the service. The modifications may be made, for example, via an intelligent network service management access point (SMAP) which allows the operator or even the subscriber himself to change the database 36 records constituting the subscriber profile information as appropriate.

Preferred methods therefore provide a secure method of communication, wherein triggers set on say originating subscriber identity, destination subscriber number, IP address, flow ID or payload information can be mapped to intelligent network service logic available to the subscriber. Preferred arrangements in effect permit the creation of a virtual private network (VPN) for communication between the end terminals 10 and 12. Preferred arrangements represent a triggered intelligent network service on an intermediate-system (i.e. on a switch/router within a network), rather than an application based system operating on end terminals. An advantage is that the same service can be triggered for any subscriber and, if desired, the algorithms or keys used in encryption can be proprietary to a subscriber. Paying subscribers can benefit from the advantages, whether they are in home or visitor networks provided the network operators of the relevant home and visited networks are party to a roaming agreement.

Individuals or commercial entities who are subscribers and have paid for specific services will be identified in the group lists held within the service data base and can benefit from a secure network service customised according to their own preferences.

Another advantage is that commercial entities or other group subscribers can define an algorithm to be used exclusively in connections between members of a specific group. That is, company A could define an algorithm to be used in transfers between employees of company A only; in which case when establishing a connection between company A employees, the service control point 34 would inform the service switching point 32 to forward an encryption algorithm specific to company A to the encryption engine 40.

Another advantage is that because handling of encryption is in fact network based there is no need to store encryption or compression algorithms or the like at either of the respective end terminals 10, 12.

Intelligent network elements 30 can cause encryption keys or even encryption algorithms themselves to be loaded and used at encryption end points associated with the service switching point 32. The encryption engine 40 may, but does not need to-be, part of the intelligent network elements 30 served directly by the service switching point 32 which triggers the service. For example, the triggering service switching point 32 may simply redirect packets or flows of a specific subscriber to an encryption engine 40 on a separate network/sub-network, by re-routing to the relevant host in order to enter the encryption engine 40. Of course, a decryption point would still need to be located at the end point 42 or at least within the secure network (B)

In one modified version the algorithm is run in a centralised encryption (or compression etc) network element (NE) separate from the service switching point 32 but still within the first network (A). In this case, the service control point 34 returns routing instructions (e.g. a tunnel to the NE) and any encryption parameters to be used in the encryption NE. Corresponding means may be provided within the second network (B) to effect decryption/de-compression of the message. In another modified version, the service is triggered in response to a specific message sent by the source terminal. That is, the service is specifically commanded by the end terminal in communication.

In another modified version, the service switching point 32 may refer to the service control point 34 as a matter of course. (i.e. without a trigger being recognised). The records in the service data base then being accessed by the service control point 34 to determine specific routing instructions and encryption/decryption information.

Where roaming agreements are in place between the operators of networks (A) and (B), corresponding secure network services can be provided on service switching points in the visited network. These service switching points may run algorithms set up in advance through agreement between the network operators or transferred dynamically, for example upon an end terminal attaching to a visited network. Alternatively, distribution of the necessary encryption/decryption information may be achieved via a secure virtual home environment (VHE) mechanism or by a distribution method/arrangement described hereinafter.

Figure 3:
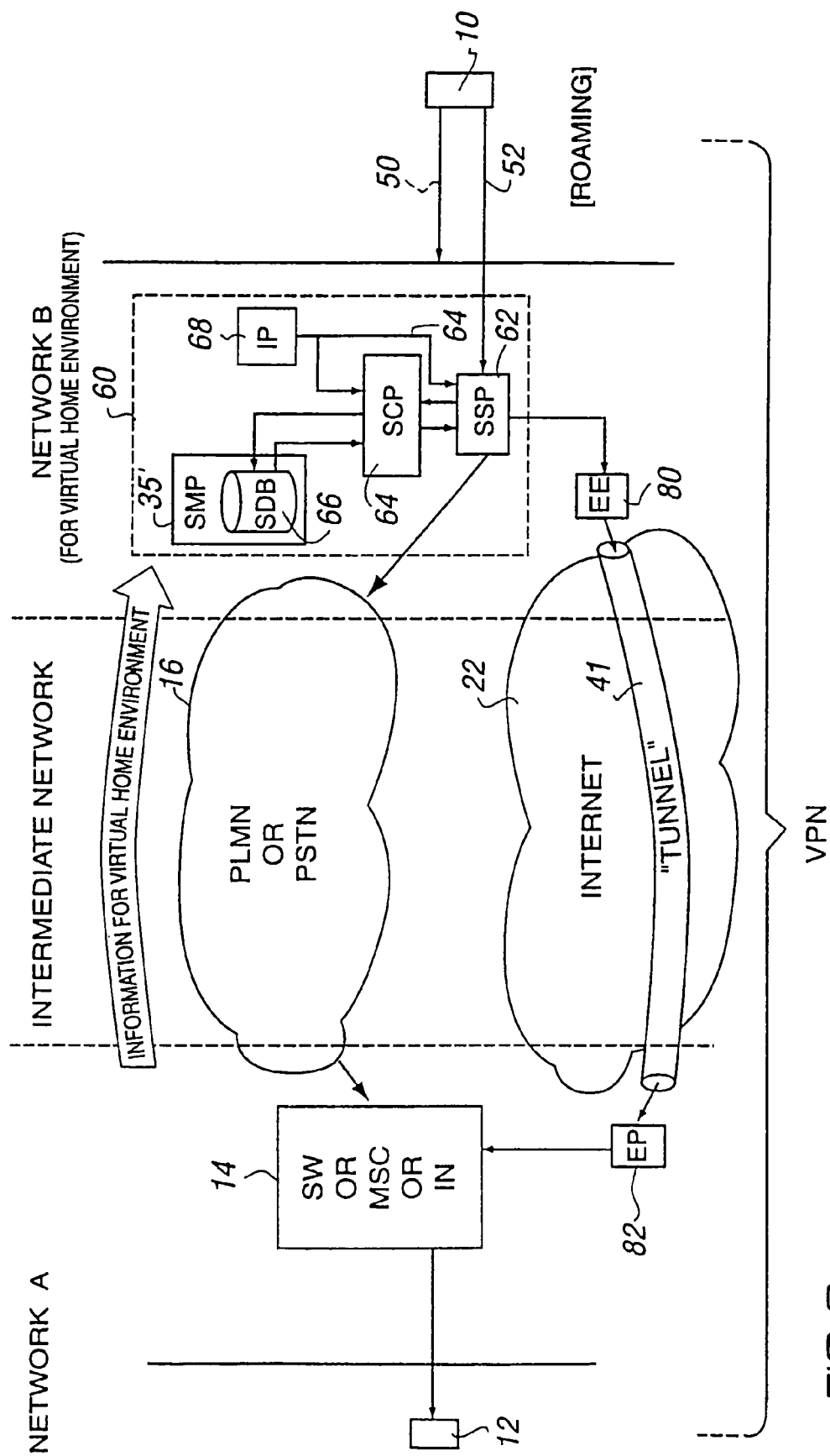
FIG. 3 schematically illustrates the method of FIG. 2 applied to communication to and from a roaming mobile terminal.

FIG. 3 shows how a roaming agreement set up between the operators of networks (A) and (B) may allow originating end terminal 10 to benefit from the advantages of the preferred method while visiting network (B). End terminal 10 in effect experiences a virtual home environment (VHE) facilitated by secure communications between the network operators party to the agreement. The virtual home environment enables terminal 10 to initiate the normal access 50 and connection set up 52 operations as if it was located in its home network. If the subscriber of end terminal 10 normally benefits from secure network communications provided by his home network operator, a trigger set up using intelligent network elements 60, as mentioned above will be identified in the service switching point 62. If no such trigger is identified the service switching point will route the call via the PLMN/PSTN 16 or via the Internet 22 non securely. Where a trigger is identified by the service switching point 62, the service control point 64 accesses the service database 66 in which the subscriber profile contains encryption information. According to the profile information contained in service database 36, in this example routing information, encryption information and group subscriber lists, etc., the service control point 64 controls the service switching point 62 to redirect the call in a secure manner via the Internet 22. As before, the message would be then redirected to an encryption engine 80 where the message is encrypted before it enters a tunnel 41 for secure transfer through the Internet 22 to a secure end point 82 within the destination network (A). From this end point 82, the call is routed via the switch 14 to the destination end terminal 12. Triggers are available not only in the originating network on messages from the source terminal but also in the destination network on messages intended for the destination terminal.

The above type of secure service can be made available anywhere in the world provided subscribers are visiting areas covered by roaming agreements with their home network operator. These services can be run from any terminal because the manner of operation means they are actually effected on the network. All of the earlier mentioned advantages apply to such roaming methods.

In order for originating and terminating end points to decipher encrypted (or compressed) data, they must have access to the relevant decryption (or de-compression) algorithms and/or keys and be able to run them. In the cases of the methods of FIGS. 2 and 3, the encryption end points 40, 80 and 42, 82 need to be provided with the relevant encryption/decryption information. It is desired that only those for whom the message is intended can access the algorithms and/or keys which enable the message to be deciphered. Moreover, these keys should not be distributed over insecure networks. Where transmission of decryption information is unavoidable, it should be distributed over networks in a secure manner.

Two trusted network operators such as the operators of the first and second networks (A) and (B) would normally have access to corresponding encryption/decryption keys. Nevertheless, the subscriber may still prefer to pay extra for specific algorithm services which in effect function as an additional layer of encryption or represent a specific tunnel construction. In addition to the Internet 22, insecure intermediate networks may include fixed and mobile networks over which the network operator cannot offer the standard of encryption required. Where this situation occurs, security beyond the basic ciphering provided in for example GSM networks (and future UMTS networks) may be required by network users. When such additional protection is required, the destination end point 42 and/or the destination end terminal 12 must have access to the necessary decryption information which is typically an algorithm or a key. The intelligent triggered method of FIG. 4 works by querying a security server connected in an intelligent network as an intelligent peripheral as described below.

Figure 4:
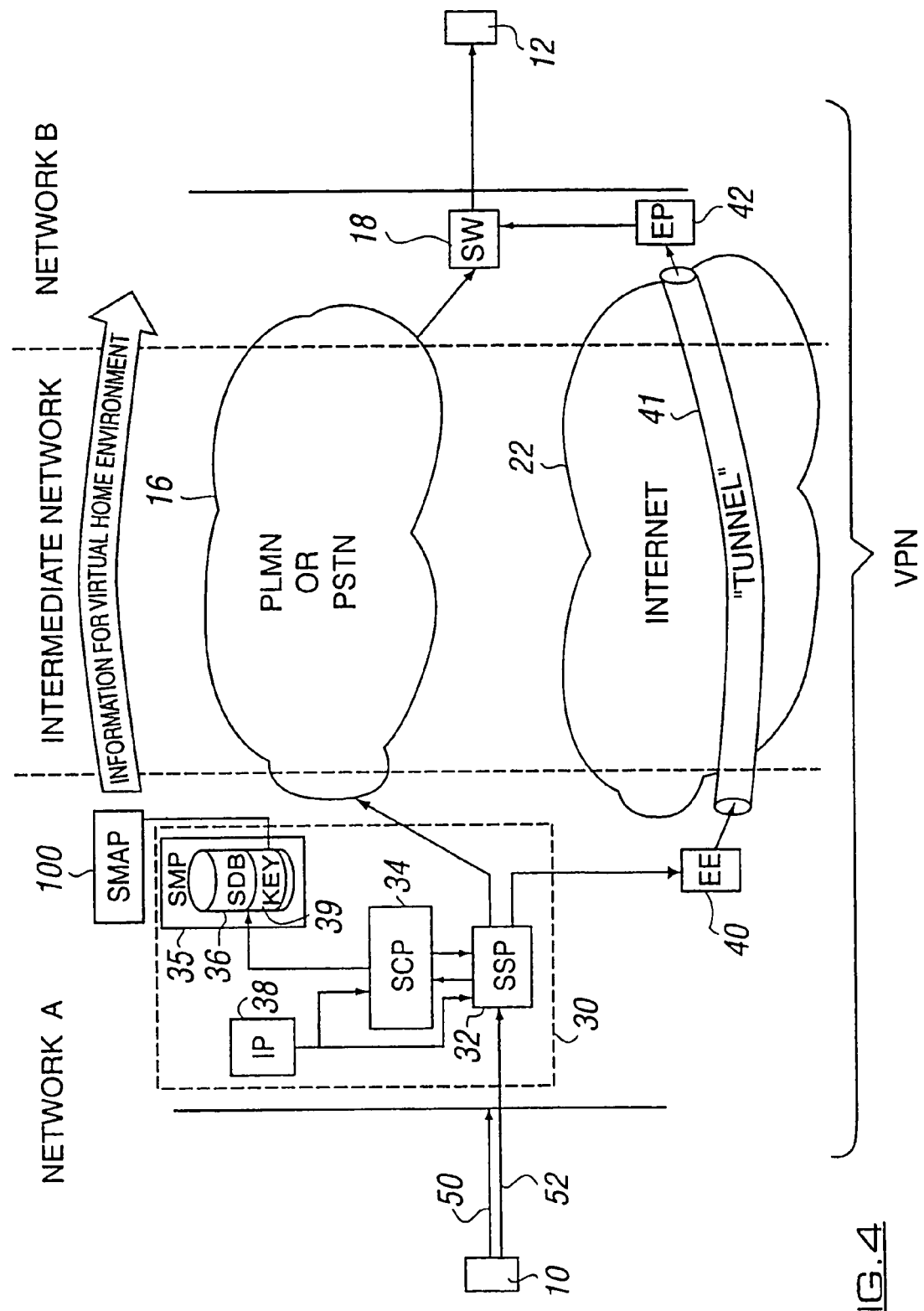
FIG. 4 schematically illustrates a preferred method for the distribution of security information.

FIG. 4 schematically shows a preferred method for the distribution of encryption/decryption information. The illustrated network uses an algorithm/key distribution system managed by intelligent network elements 30. The arrangement of FIG. 4 is similar to that of FIG. 2 and like reference numerals indicate like features. A first end terminal 10 wishes to communicate with a second end terminal 12 in a secure manner. The originating end terminal 10 is in a first network (A) controlled by a first network operator and the second end terminal 12 is located in a second network (B) controlled by a second network operator. The networks (A) and (B) may be fixed or mobile networks operated by trusted network operators and are thus deemed relatively secure. In order for the message content to traverse the Internet 22 in a secure manner it will need to be encrypted at or before the tunnel end point defined by encryption engine 40 and decrypted at or once it has passed end point 42. Thus it is possible for encryption/decryption to occur at nodes within either of the networks (A) and (B) (e.g. encryption engine 40 or end point 42). Alternatively, it is possible for encryption/ decryption to occur at the end terminals 10, 12, respectively.

In operation, the end terminal 10 goes through the attach 50 and connection set up 52 procedures which inevitably depend on the type of network. Service switching point 32 handles the request for communication and, if present, a trigger causes the service switching point 32 to refer to the service control point 34. Examples of the various types of trigger set-up available were mentioned earlier with reference to FIGS. 2 and 3. The SCP 34 provides an intelligent function and can refer to a subscriber profile in the service database 36 of the service management point SMP 35. The subscriber profile provides subscriber specific encryption information and may also provide routing preferences. The service control point 34 then communicates with the service switching point 32 to route the transfer either through the PLMN/PSTN 16 or via the Internet 22. Where the subscriber profile in service database 36 specifies encryption, the message is routed to the encryption engine 40 and onwards to switch 18 via the Internet 22. There is a corresponding end point 42 where the message is decrypted within the secure network (B). It would of course be possible for the relevant decryption to be performed at the end terminal 12.

An intelligent network service management access point (SMAP) 100 allows the operator to alter records in the database 36 and, therefore, specify, load and change the algorithms or keys to be stored and/or distributed. Accordingly, a given subscriber can manage his own key hierarchy by instructing the network operator to make, delete or alter relevant entries in the database 36.

Note that the network (A) includes intelligent network elements 30 and the service database 36 containing security information managed by the operator of network (A). An intelligent peripheral could also hold security information for example, keys. The security information stored in service database 36 of the service management point SMP 35 might include encryption algorithms, compression algorithms, keys 39, secure numbers or bit strings etc. for use in connection with electronic cash applications etc. As before, where this security information is held within or is associated with a given subscriber profile, it can be proprietary to a specific subscriber. A selection of different algorithms or keys may be held in association with a specific group of subscribers. More than one algorithm/key may be stored in the service database 36 with the various items being held in a hierarchy along with specific instructions for use thereof.

Preferred network arrangements can be set up to automatically communicate the particulars of encryption or indeed whether or not encryption is required at all. Preferred networks can be set up to ensure decryption algorithm/keys are received by the or each destination end terminal, either at the same time or at a different time to the message itself. That is, any one who was targeted as a recipient of a message can automatically receive the relevant decryption information. As before, the effect is to create a virtual private network between communicating end terminals.

Where a message is a broadcast message intended for a target group consisting of a number of end terminals 12, a plurality of keys 39 can be distributed simultaneously for the plurality of target end terminals 12. Since the second network (B) is deemed to be secure, it is not necessary for terminating end terminals 10, 12 to run decryption applications nor handle any type of algorithm/keys at all. Encryption or decryption can be performed at any secure points within, for example, networks (A) and (B) under the control of the intelligent functions as described with reference to FIGS. 2 and 3. Thus it is possible for preferred embodiments to distribute security information such as encryption/decryption information to a node within a secure network, rather than the destination end terminal for the communication in question (see also FIG. 6 and 7). In such cases the receiving node in the secure network acts on behalf of the destination end terminal to proxy the relevant service, e.g. decryption.

However, in certain circumstances it may be that distribution of decryption information for example keys to end terminals is preferred and this is also possible provided the or each end terminal in question is provided with the means necessary to run the decryption application. The distribution of a key need not be triggered specifically by a message content associated with a call. The intelligent network may, for example, periodically distribute keys to selected end points or end terminals or in response to external events. Thus with a preferred network incorporating an intelligent network function for the distribution of encryption/decryption information, keys can be distributed for any party attached to any point in the network and the distribution process can be network initiated. That is network-initiated key up dates can be propagated to secure end points 42 within the destination network or directly to end terminals 12 of subscribers between sessions or calls. The network-initiated update may be to the or each user selectively or it may be to one or more of the operators and the distribution thereafter managed by the operator. Similarly, any modifications or changes to algorithms/keys or the key hierarchy can be specified and transmitted to destination nodes with great efficiency.

The timings of network-initiated key distributions can be selected to maximise security. For example, the keys may not be distributed simultaneously with the messages they may be distributed at different predetermined times which may be regular or irregular times. All of the above services would be available on a fixed network or on a mobile network and in the latter case switching on or moving, for example, may be used as triggers to push encryption information updates around the various networks. In one embodiment, the distribution is triggered when a mobile station initiates communication with a visited network.

In mobile networks where the originating and/or terminating end terminal is visiting another operator's network, the service may be offered in accordance with roaming agreements. Preferably, trusted communications between reputable network operators will permit a virtual home environment (VHE) to be provided to visiting mobile terminals and, therefore, a subscriber could have access to the service anywhere in the world provided the local network is party to such an agreement. A virtual home environment is facilitated when information concerning all aspects of the service possibly including encryption/decryption information, is shared between network operators in a secure manner.

Recipient end terminal users can specify that they wish to answer calls only according to certain circumstances. For example, they may choose not to answer any calls which are not accompanied by keys or for which they do not have access to keys.

Public keys can be securely distributed to target subscribers over usually insecure intermediate networks for use with a private key service held at a secure location within one of networks (A) or (B). Alternatively, private keys may be distributed specifically to the service subscriber for him to use exclusively in signing certificates or data. This service has obvious advantages over a system in which keys are distributed in a non-specific manner.

Signed certificate data can be verified by the public key distributed to other parties needing authentication of the sender. Where public keys are made available by general broadcast or held at specific sites it is desirable for the validity of the key to be certified by some authority. Network operators may authenticate signed data/keys that is, act as a Certification Authority and, where appropriate, charge for the service.

In cases of secure symmetric encryption, a shared (secret) key can be distributed for secure sessions between two or more end terminals 10, 12 wishing to form secure connections across one or more usually insecure networks. Secure encryption techniques are possible because the intelligent network elements 30 and particularly the tunnel entry 40 and tunnel exit 42 end points are located within networks owned by trusted network operators using network specific (e.g. GPRS or GMS) encryption.

Figure 5:
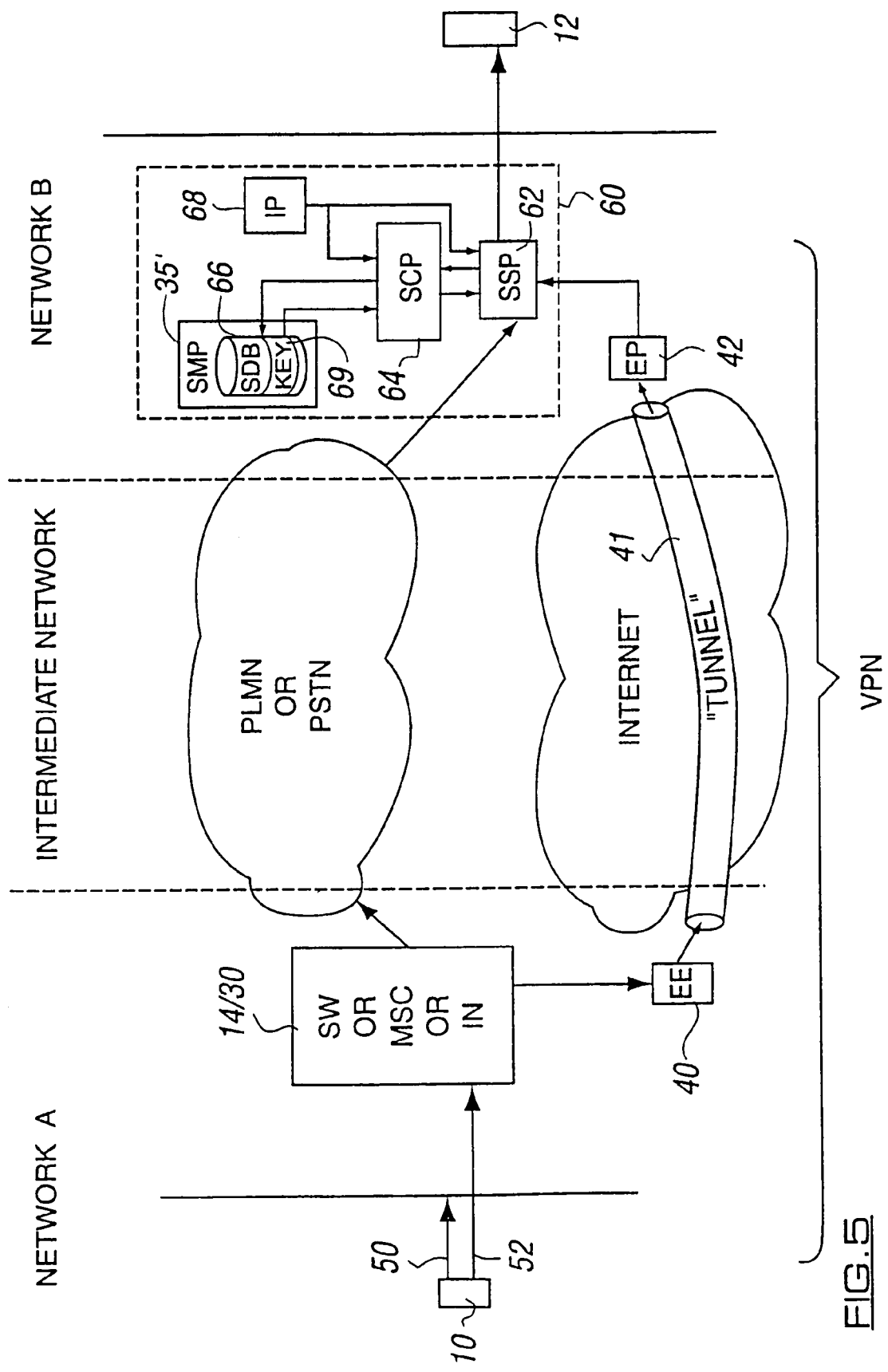
FIG. 5 schematically illustrates a second method for the distribution of security information.

The intelligent network function for the distribution of encryption information may be provided in originating network (A) or terminating network (B). In fact, one or more intelligent network elements may be provided in both ends of the communication chain. FIG. 5 shows an arrangement in which intelligent network elements GO are provided at the destination end of the communication chain. In order to communicate a message, the end terminal 10 would go through the usual access 50 and connection set up 52 procedures, regardless of the type of switch 14 in network (A) which may be, for example, a fixed telecommunication switch, an MSC or an intelligent network element. Assume also that switch 14 is operable to direct the transfer via the Internet 22 in an encrypted form. The message would thus be routed to a first tunnel end point, in this case defined by encryption engine 40. The exit to the tunnel 41 is defined by a second tunnel end point 42 from where the message is routed to intelligent network elements 60.

When the message reaches the group of intelligent network elements 60 it is received by service switching point 62. If a trigger has been set up and is identified, the service switching point 62 refers to the service control point 64. SCP 64 provides an intelligent function and accesses the service database 66 of the SMP 35 to get information on the algorithm or key relevant to the message in question. Information in the service database 66 can be associated with the message by any suitable means, e.g. by the ID of the originating subscriber or the destination number. In fact, the trigger may operate in response to any address message, ID, IP address, flow ID or payload information etc. The relevant encryption information, in this case key 69, is transmitted back to the service control point 64 and then on to the service switching point 62 for transfer directly to the destination end terminal 12.

All advantages described in relation to the method of FIG. 4 also apply here. For example, subscribers are able to control and manage their own key hierarchy in the same way as described with reference to FIG. 4.

Clearly, the or each group of intelligent network elements 30, 60 providing the triggering and distribution functions can be positioned at any convenient point in the communication chain, provided that the chosen location is approximate in terms of security. Further, the elements of the or each group of elements 30, 60 providing the trigger (recognition) and distribution functions, namely the service switching points 32, 62 and the service control points 34, 64 need not be in the same part of the distribution chain. That is, a first group of intelligent network elements 30 in network (A) can instruct a second group of intelligent network elements 60 in network (B) to distribute a key (or algorithm) to one or more destination end terminals 12.

Where added encryption is required on usually secure networks (e.g. PLMN/PSTN 16), it is possible to provide an arrangement wherein the necessary encryption/decryption means 40, 42 are provided in the communication chain at either end of the PLMN/PSTN 16 network or on the end terminals 10, 12.

Short message services (SMS) could be used to deliver keys. However, under short message service conditions nothing would be automatic, i.e. the key would not necessarily be received when the call is received in which case it would need to be requested subsequently. Short message service delivery may not always be possible if the receiving party is analogue mobile or fixed telephone. Preferred embodiments are therefore most effective when used with fixed or mobile terminals whereas GSM mobile has the additional option of SMS services. Alternatively, security information of the various types referred to herein can be distributed by means of USST in the form of unstructured supplementary data.

Under certain circumstances, it may be preferable for the security information such as keys to be delivered on control channels rather than on user channels.

Figure 6:
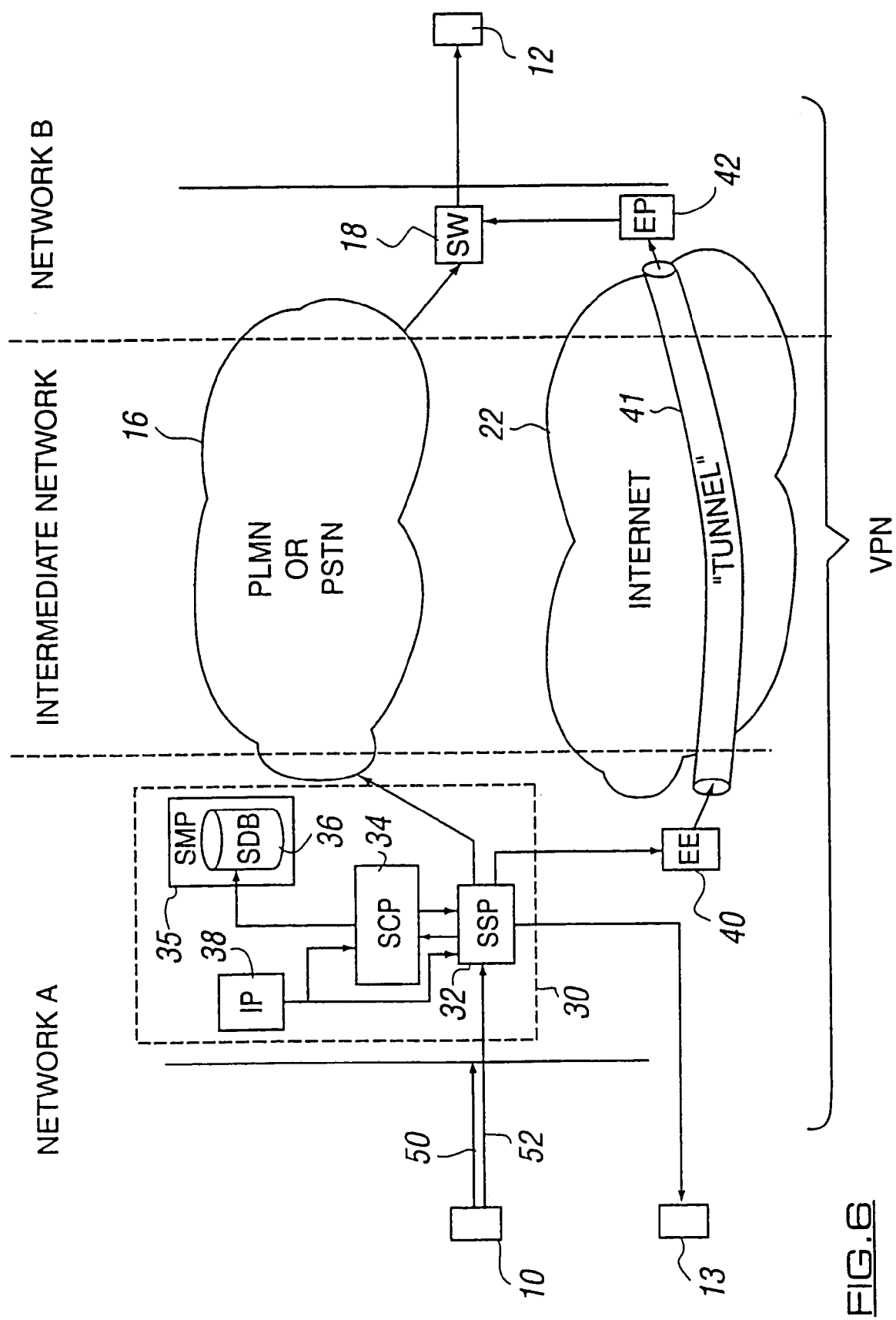
FIG. 6 schematically illustrates another method for the distribution of security information.

A further embodiment is described with reference to FIG. 6. In order to proxy electronic-payment on behalf of an end-terminal 10, storage in a network element such as a service control point or a service data base 36 or an intelligent peripheral 38 may be provided for electronic-cash bit strings. Alternatively, storage for electronic cash related information may be provided in a separate electronic payment network element. Electronic-cash held in the electronic-payment network element SCP 35 or SMP 35 or some dedicated electronic payment network element could transfer electronic-cash as electronic-cash bit strings over the networks 16, 12 in a secure manner to receiving end terminal 12 where payment is required. In other circumstances payment may be made to end terminal 13 within the same secure network in a similar manner. This electronic-payment service is available to those end-terminals that have subscribed to these services and are recognised by their subscriber identities known via the service switching point 32. The subscriber on whose behalf the payment was made may then be billed by conventional means if necessary, that is by the network operators billing centre.

Figure 7:
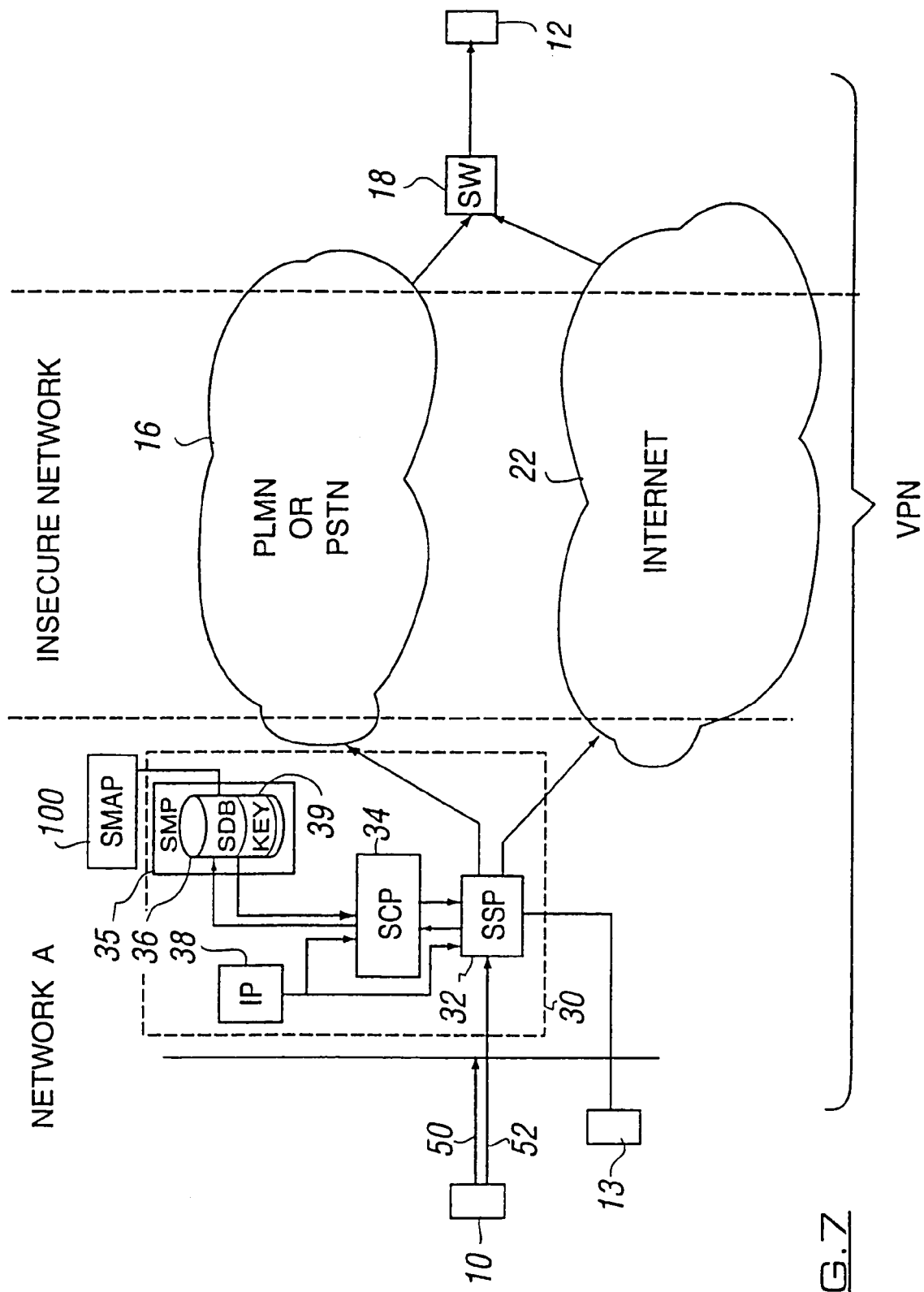
FIG. 7 schematically illustrates another method for the distribution of security information.

With reference to FIG. 7, a network element, such as an Intelligent Peripheral 38, may be provided in the secure network (A) to sign messages or certificates originating from an end-terminal 10 in the secure network (A) and destined for other communicating parties which are either within the same secure network such as the end terminal 13, or more likely to an end terminal 12 in another network such as the PLMN/PSTN 16 or Internet 22 connected to the secure network. The switch 18 is shown to illustrate that a receiving end-terminal 12 can be connected to the PLMN/PSTN 16 or the Internet 22 or both. Switch 18 need not be shown if a direct connection is made to the PLMN/PSTN 16 or the Internet 22.

The operator of network (A) can distribute the security information to many end-terminals 10, 12, 13 in a group simultaneously as a multicast to the group or as multiple separate point-to-point communications. Group lists are maintained by the operator of network (A) in the service data base 36 and subscribers can be added/removed from the lists. This allows distribution to more than one end-terminal simultaneously on the occurrence of a single event such as a network trigger from a connection set up, a specific command from an end-terminal or a network-initiated distribution from a periodic trigger or external event, for instance in the knowledge that the old security information has been compromised. The network operator thus controls a secure network with many authenticated subscribers at many end-terminals. This permits the secure distribution of new/updated security information to many subscribers at the occurrence of a single network event.

It is also possible for preferred embodiments to distribute security information to a node within one or more of the first and second secure networks, rather than the destination end terminal for the communication in question. The receiving node in the secure network can act on behalf of the end terminal to proxy such services as encryption/decryption, electronic payment or signing messages/certificates.

The schematic illustrations of preferred embodiments are not intended to limit the invention to one or more of the specific arrangements disclosed herein. For example, the or each of the network elements for performing the invention may be provided in any suitable arrangements and one or more is likely be provided in different hierarchical layers of the relevant telecommunication network.

The invention claimed is:

1. A method for secure communication between a first end terminal located in a first secure network and a second end terminal located in a second secure network, said first and second networks being separated by a relatively insecure intermediate network and a relatively secure intermediate network, the method including the steps of:

selectively routing, over said relatively insecure intermediate network or said relatively secure intermediate network, a predetermined type of communication identified by a trigger from the first end terminal to the second end terminal over said relatively insecure intermediate network by means of at least one network element triggerable to refer to information held in a storage means to selectively route said communication according to said information held in said storage means; and encrypting said selectively routed communication by means of an encryption engine before it traverses said intermediate network, wherein said at least one network element and said encryption engine are located substantially within said first secure network.

2. A method as in claim 1, wherein said at least one network element comprises switch means provided with control means and said storage means.

3. A method as in claim 2, wherein said storage means is operable to store said information comprising routing information.

4. A method as in claim 2 or 3, wherein said storage means is operable to store said information comprising security information.

5. A method as in claim 2, wherein said storage means is operable to store said information comprising security information including at least one of the following: encryption information; decryption information; security key information; and electronic cash information.

6. A method as in claim 3, wherein said switch means is operable to selectively route the predetermined type of communication according to routing information in said information held in the storage means.

7. A method as in claim 4, wherein said encryption engine is operable to encrypt said predetermined type of communication according to security information in said information held in said storage means.

8. A method as in claim 6, comprising the step of identifying said predetermined type of communication by means of at least one of the following: originating subscriber characteristics; destination subscriber characteristics; payload characteristics; and network service characteristics.

9. A method as in claim 8, wherein said predetermined type of communication is identified by means of originating and/or destination addresses.

10. A method as in claim 8, wherein said predetermined type of communication is identified by means of originating and/or destination identification numbers.

11. A method as in claim 4, wherein said storage means is operable to store said information comprising security information, said security information being distributed from a first node to at least one target node responsive to a predetermined trigger.

12. A method as in claim 3, wherein the stored routing information includes subscriber routing preferences.

13. A method as in claim 4, wherein the security information includes subscriber security preferences.

14. A method as in claim 4, wherein the security information includes encryption/decryption information defining a preferred algorithm or key for use with predetermined types of communication.

15. A method as in claim 2, wherein said information stored in the storage means is arranged to identify at least one group of users whose communications are to be routed and encrypted according to common preferences.

16. A method as in claim 2, further comprising providing a service management access point for accessing and changing said information held in the storage means.

17. A method according to claim 16, wherein said providing comprises providing said access point to a subscriber in a visited network by virtue of a roaming agreement between an operator of the visited network and an operator of the subscriber's home network.

18. A method as in claim 11, wherein said security information comprises decryption information, a distribution of said decryption information being triggered according to a predetermined schedule.

19. A method as in claim 11, wherein said security information is distributed to a node within at least one of the first and second secure networks.

20. A method as in claim 11, wherein said security information is distributed to an end terminal for the communication in question.

21. A method as in claim 11, wherein the at least one network element distributes said security information from a location substantially within the first secure network.

22. A method as in claim 11, wherein at least one network element distributes said security information from a location substantially within the second secure network.

23. A method as in claim 22, wherein said security information is transferred to the at least one network element located in the second secure network by means of a secure communication route operated by trusted network operators.

24. A method as in claim 22, wherein said security information is transferred to the at least one network element located in the second secure network by means of a secure communication route over said relatively insecure intermediate network.

25. A method according to claim 1, wherein said selectively routing step comprises providing said routing to a subscriber in a visited network by virtue of a roaming agreement between an operator of the visited network and an operator of the subscriber's home network.

26. A secure network arrangement for communication between a first end terminal located in a first secure network and a second end terminal located in a second secure network, said first and second networks being separated by a relatively insecure intermediate network and a relatively secure intermediate network, the secure network arrangement including:

at least one network element triggerable to refer to information held in a storage means to selectively route over said relatively insecure intermediate network or said relatively secure intermediate network a predetermined communication identified by a trigger according to said information held in said storage means from the first end terminal to the second end terminal over said relatively insecure intermediate network; and an encryption engine for encrypting said selectively routed communication before it traverses said intermediate network, wherein said at least one network element and said encryption engine are located substantially within said first secure network.

27. A secure network arrangement according to claim 26, wherein said at least one network element comprises a switch means provided with a control means and said storage means for storing said information including routing and encryption/decryption information.

28. A secure network arrangement according to claim 27, wherein the switch means is operable to selectively route said predetermined communication according to routing information held in the storage means and the encryption engine is operable to encrypt said selectively routed communication according to encryption information held in said storage means.

29. A secure network arrangement according to claim 28, wherein said predetermined communication is identified by means of at least one of the following: originating subscriber characteristics; destination subscriber characteristics; payload characteristics and network service characteristics.

30. A secure network arrangement according to claim 29, wherein said predetermined communication is identified by means of an originating or destination address.

31. A secure network arrangement according to claim 30, wherein said predetermined communication is identified by means of originating identification or destination numbers.

32. A secure network arrangement according to claim 30, wherein the routing information and encryption/decryption information specifies operations according to subscriber preferences.

33. A secure network arrangement according to claim 32, wherein the encryption/decryption information defines a preferred algorithm or key for use with said predetermined communication.

34. A secure network arrangement according to claim 33, wherein the information held in the storage means identifies at least one group of users whose communications are to be routed and encrypted according to common preferences.

35. A secure network arrangement according to claim 26, comprising a service management access point for accessing and changing the information held in the storage means.

36. A secure network arrangement for communication between a first end terminal located in a first secure network and a second end terminal located in a second secure network, said first and second networks being separated by at least intermediate network, wherein at least one communication route through which constitutes a relatively insecure communication route and at least one route constitutes a relatively secure communication route from the first end terminal to the second end terminal, the secure network arrangement including at least one network element triggerable to selectively route a communication from the first end terminal to the second end terminal over said relatively insecure communication route or said relatively secure communication route; and an encryption engine for encrypting said selectively routed communication before it traverses said relatively insecure intermediate network, wherein said at least one network element and said encryption engine are located substantially within said first secure network.

37. A secure network arrangement according to claim 36, including decryption means located substantially within the second secure network.

38. A secure network arrangement according to claim 37, wherein said decryption means are provided at the second end terminal.

39. A secure network arrangement according to claim 37, wherein said decryption means are provided at a node other than the second end terminal.

40. A method for the distribution of security information between a first node in a first secure network and at least one second node in a second secure network, said first and second networks being separated by a relatively insecure network, wherein communications from said first node to the at least one second node via said relatively insecure network are encrypted, the method comprising providing at least one network element operable to store security information and being triggerable to distribute said security information in a secure manner from said first node to at least one target node in said second secure network.

* * * * *